Sept. 12, 1950

E. W. MARLOWE
EMERGENCY BREAK-IN SYSTEM
FOR COMMUNICATION SYSTEMS
Filed March 30, 1948

2,521,860

INVENTOR.
Elbert W. Marlowe
BY
HIS ATTORNEY

Patented Sept. 12, 1950 2,521,860

UNITED STATES PATENT OFFICE 2,521,860

EMERGENCY BREAK-IN SYSTEM FOR COMMUNICATION SYSTEMS

Elbert W. Marlowe, Wilkinsburg, Pa., assignor to The Union Switch & Signal Company, Swissvale, Pa., a corporation of Pennsylvania Application March 30, 1948, Serial No. 17,999

3 Claims. (Cl. 250—13)

Figures 1, 2:
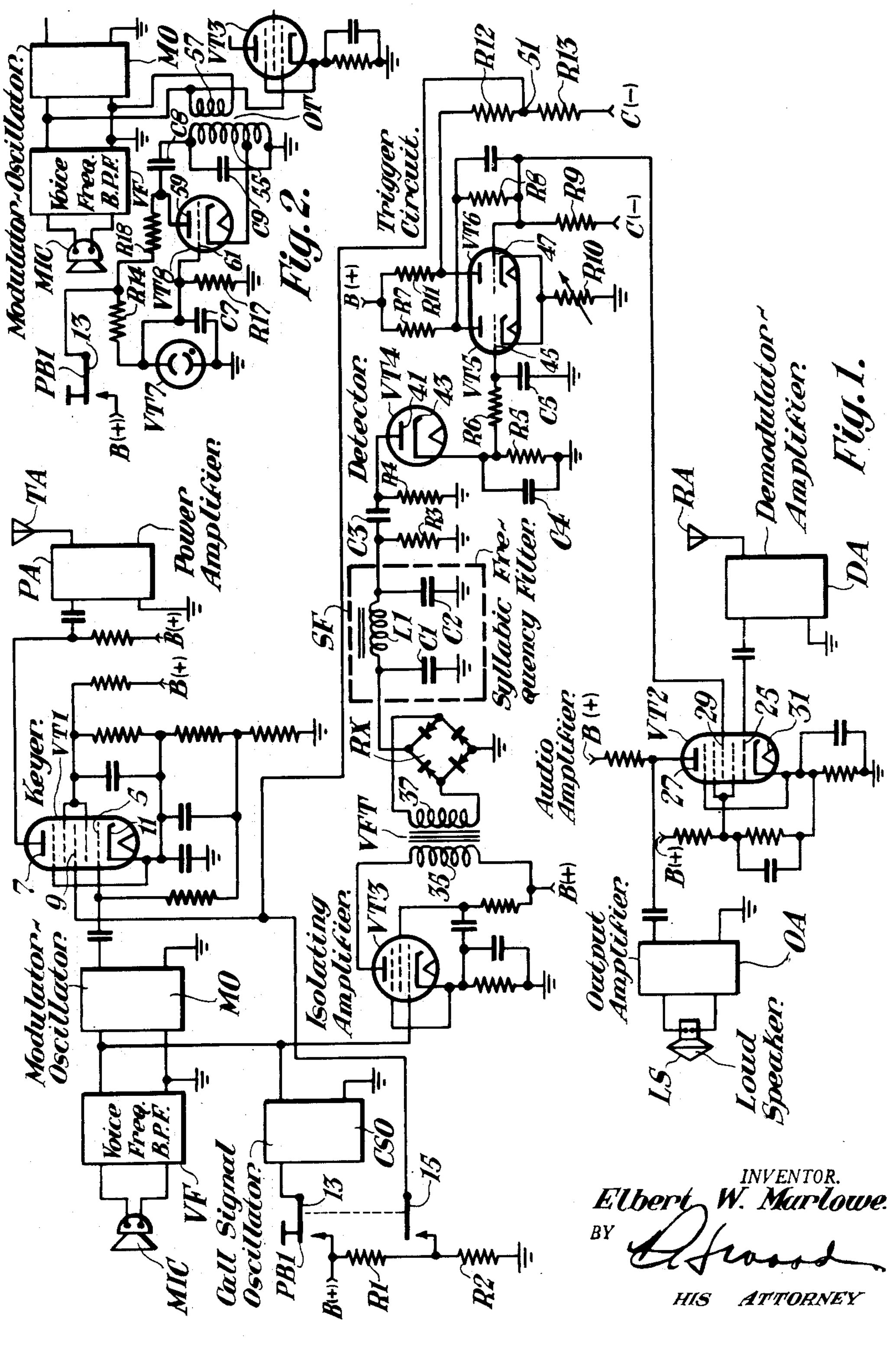

My invention relates to communication systems, and particularly to improved means for providing break-in operation of such systems.

When a communication system utilizes a single frequency channel for transmission and reception to which access may be had to any time by a station desiring to transmit, it will be apparent that another station is unable to communicate with the station which is transmitting. That is, communication systems of this type are usually operated on a "push-to-talk" basis, and during the time a station is transmitting its receiving equipment is rendered inactive, and vice versa. Thus a station which is transmitting cannot hear an incoming message since its receiver is cut off during the time the transmitting equipment is retained in its active condition.

Such types of single channel communication systems are often used where the receivers of all the stations of the system are retained active during non-communication periods ready to receive a message and a call sent out by any station is picked up by all of the other stations. For example, such communication systems are used on aircraft, for railway train communications, etc. It is quite often necessary for a station to send out an emergency message that should be received without delay by all of the other stations, at least those stations within the usual range of transmission. With the "push-to-talk" arrangement heretofore used, a calling station has no way to break-in on a station whose transmitter is switched to an active condition and this station would not receive an emergency message.

Accordingly, an object of my invention is to provide a single frequency channel communication system having voice operated switching means selectively responsive to audio frequencies modulated at syllabic frequencies, and having call signal means for generating audio frequencies modulated at syllabic frequencies to actuate the voice operated switching means.

A further object of my invention is to provide a communication system incorporating a novel voice operated switching means for switching the transmitter on, and which switching means is responsive only to the syllabic frequencies present in speech, and not responsive to noise, or a steady tone.

Another object of my invention is to provide an improved break-in system for communication systems of the type described.

Another object of my invention is to provide a break-in system which does not interfere with the normal use of the equipment.

A further object of my invention is to provide a break-in system for communication systems of the class described, which will be rapid in operation.

A further object of my invention is to provide a break-in system in which the transmitter of each individual station is switched on only when the transmitter is modulated, so that the receiver is rendered active during short pauses in the speech of the person operating the equipment.

Other objects of my invention and features of novelty therein will be apparent from the following description taken in connection with the accompanying drawings.

In practicing my invention, I provide at each station in a communication system which employs a single frequency channel, means for switching on the transmitter and switching off the receiver when and only when the operator is speaking into the microphone. During pauses in the speech, the transmitter is switched off and the receiver is switched on. In order that the equipment will not be responsive to noises other than speech, the switching apparatus is made responsive only to sounds modulated at syllabic frequencies.

I shall describe two forms of communication system embodying my invention and shall then point out the novel features thereof in claims.

In the drawings, Fig. 1 shows a diagrammatic view of a station in a single frequency channel communication system embodying my invention, and Fig. 2 is a fragmentary view of a modification of the apparatus shown in Fig. 1.

Similar reference characters refer to similar parts in each of the two views.

It is to be understood that although this system is shown and described in connection with a space radio communication system, it is readily adaptable to carrier current signaling or inductive communication systems.

Referring to Fig. 1, the apparatus shown may be divided into three portions, a transmitting portion, a receiving portion, and a switching portion. High voltage direct current energy is supplied from a source not shown, the positive terminal of which is designated by the reference character B(+) and the negative terminal of which is grounded. Grid bias voltage is also supplied from a source not shown, the positive terminal of which is grounded, and the negative terminal of which is designated by the reference character C(−). To simplify the drawing, the circuits for supplying energy to the heaters of the various tubes have not been shown.

The transmitting portion or transmitter comprises a microphone MIC, a voice frequency band pass filter VF, a call signal oscillator CSO governed by a push button PB1, a modulator-oscillator MO, a keyer including the vacuum tube VT1, a power amplifier PA and a transmitting antenna TA. The transmitter may be arranged in any well-known manner, and may be of the frequency modulation type, the amplitude modulation type, or other suitable type, according as the system employs frequency modulation, amplitude modulation, or some other system of modulation. It is deemed sufficient to point out that the voice frequency energy from the microphone MIC is passed through the voice frequency band pass filter VF to the modulator-oscillator MO where a center or carrier frequency generated therein is modulated by the voice frequency energy. The modulated carrier frequency is supplied through the keyer tube VT1 to the power amplifier PA where it is amplified and supplied to the transmitting antenna TA.

The keyer tube VT1 is a multi-grid vacuum tube which is arranged and constructed so that the modulated carrier frequency energy which is supplied to a first control grid 5 causes corresponding variations in the circuit including the plate 7 of tube VT1 when and only when a second control grid 9 has a positive potential with respect to the cathode 11. Accordingly, it will be seen that the modulated carrier energy is supplied to the power amplifier PA only when the control grid 9 of tube VT1 is driven positive with respect to the cathode 11, so that energy is radiated from the antenna TA only at such time as the grid 9 of vacuum tube VT1 is positive with respect to its cathode 11.

The call signal oscillator CSO is arranged and constructed so that when contact 13 of push button PB1 is operated, high voltage energy is supplied to the oscillator to thereby generate a high-pitched audio frequency which is supplied to the modulator-oscillator MO. At the same time, contact 15 of push button PB1 connects the grid 9 of vacuum tube VT1 to a low voltage positive potential which is produced by the voltage divider comprising resistors R1 and R2 connected across the power source. At this time, therefore, the carrier frequency generated by the modulator-oscillator MO is modulated by audio frequency energy supplied thereto from the call signal oscillator CSO, while the grid 9 of vacuum tube VT1 is driven positive, so that the modulated carrier frequency energy is supplied to the power amplifier PA and is thereafter radiated from the antenna TA.

The receiving portion or receiver of the equipment comprises a receiving antenna RA, a demodulator-amplifier DA, an audio amplifier including vacuum tube VT2, an output amplifier OA, and a loud speaker LS. The demodulator-amplifier DA may be of any of the types well-known in the art, such as, for example, a heterodyne receiver or a tuned radio frequency receiver; and may be of the frequency modulation, amplitude modulation or other type to match the type of transmitter modulation which is used. The actual construction and operation of the demodulator-amplifier DA is not necessary to an understanding of my invention, and it is deemed sufficient to point out that an incoming modulated signal wave is picked up by the receiving antenna RA and supplied to the demodulator-amplifier DA where it is amplified and demodulated. The audio frequency output of the device DA is supplied to a first control grid 25 of the audio amplifier tube VT2. This tube is of the multi-grid type and is similar in construction and arrangement to that previously described in connection with the keyer tube VT1, so that the audio frequency energy supplied to the first control grid 25 causes corresponding variations in the circuit including the plate 27 when and only when a second control grid 29 has a positive potential with respect to the cathode 31. The plate circuit of the tube VT2 is capacity coupled to the output amplifier OA, the output of which is supplied to the loud speaker LS.

From the foregoing it will be apparent that audio frequency energy from the demodulator-amplifier DA is supplied to the output amplifier OA and in turn to the loud speaker LS when and only when the second control grid 29 is driven positive with respect to the cathode 31 of tube VT2.

The switching portion of the apparatus includes an isolating amplifier VT3 having a primary winding 35 of a voice frequency transformer VFT in its plate circuit, a full wave rectifier RX, the input terminals of which are connected to the secondary winding 37 of transformer VFT, a syllabic frequency filter SF supplied with energy from the output of the full wave rectifier RX, a detector tube VT4, and a trigger circuit including the vacuum tubes VT5 and VT6, which are here shown as being contained within a single envelope.

The purpose of the switching means is to provide for switching the transmitter on and switching the receiver off during such times that the operator is speaking into the microphone MIC, the receiver being normally switched on. To accomplish this objective, the apparatus is designed and arranged so that only those frequencies which are peculiar to speech, known as syllabic frequencies, are able to cause the switching means to operate. Syllabic frequency as here considered is the frequency of the envelope of a sound wave produced by speech, and it has a range of ½ to 25 cycles per second. In other words, syllabic frequency is an envelope frequency created on a voice frequency current due to the syllables of speech.

The isolating amplifier VT3 is an amplifier connected in the usual manner and serves to isolate the switching apparatus from the remainder of the equipment. The input of the amplifier tube VT3 is connected across the output of the voice filter VF in multiple with the input of the modulator-oscillator MO and thus it receives a portion of the voice frequency energy. The output circuit of the isolating amplifier includes the primary winding 35 of the voice frequency transformer VFT, and it will be apparent that such an arrangement provides alternating current coupling so that only alternating voltages appear across the secondary winding 37 of transformer VFT. Rectifier RX rectifies the voice frequency energy, thus deriving the envelope or syllabic frequencies. By using a full wave rectifier, the frequencies of the fundamental components or carrier components of the speech are doubled, thereby enabling the use of a simple filter following the rectifier to eliminate these frequencies. This syllabic frequency filter SF may be arranged in any manner well-known in the art and is here shown as a single pi-section filter including the condensers C1 and C2 and the inductance L1. The filter SF is arranged and constructed so that it functions as a low pass filter, passing all frequencies up to a cut-off frequency of, say, 50 cycles per second. Thus the filter SF passes the second harmonics of the syllabic frequency component and suppresses all other frequencies above this value. The output of this filter is coupled to the plate 41 of the detector tube VT4 by a capacity coupling network arranged so that the direct current component of the output of the syllabic frequency filter SF is not supplied to the plate 41 of tube VT4. This coupling network includes the load resistor R3 which provides a load for the filter SF, the coupling condenser C3 and resistor R4. Accordingly, only alternating current energy at syllabic frequencies is supplied to the plate 41 of the detector tube VT4, which is an ordinary diode, and operates to rectify the alternating current supplied thereto. It will be apparent to those skilled in the art that other types of asymmetric units may be employed as the detector, for example, a crystal type of rectifier.

The rectified energy present at the cathode 43 of tube VT4 is supplied to an integrating network the output of which is supplied to the grid 45 of vacuum tube VT5 which is part of the trigger circuit to be subsequently described. This coupling network comprising the resistors R5 and R6 and the condensers C4 and C5, is designed and arranged so that the potential of the energy supplied to the grid 45 of vacuum tube VT5 rises quickly at the beginning of a syllable and falls off relatively slowly, so that it "bridges" the intervals between syllables in a burst of conversation, or "talk-spurt," and falls to zero at the end of each "talk-spurt." This may be accomplished by making R6 small so that the charging time constant for condenser C5 is relatively short and by making resistor R5 large so that the discharging time constant for coondenser C4 is relatively long. As a result, the value of energy supplied to the grid 45 of tube VT5 remains substantially constant during a "talk-spurt."

The particular trigger circuit shown is of the Schmitt type, which is shown and described in the text, "Time Bases," by O. S. Puckle, published in the United States by John Wiley & Sons, Inc. This circuit is characterized by having two stable states, and will assume one or the other of these states depending upon the instantaneous potential on the grid of one of its tubes, in this case the grid 45 of vacuum tube VT5. In the normal state, that is with the absence of a positive potential on the grid 45, the parts are arranged and proportioned so that the vacuum tube VT6 is conducting, and vacuum tube VT5 is cut off. At this time, the potential on the grid 47 of the tube VT6 is relatively high as a result of the voltage dividing action of the resistors R7, R8, and R9 bridged between the positive terminal B (+) of the high voltage power supply, and the negative terminal C(−) of the bias voltage power supply. Since tube VT6 is conducting the flow of current through the variable resistor R10, which is common to the cathodes of both tubes, causes the potential of the cathode of tube VT5 to be relatively high in the positive direction with respect to the grid 45. When the potential of the grid 45 of tube VT5 rises to a first threshold potential which is above the potential of the cathode, tube VT5 will start to conduct, and as a result, its plate potential falls. This fall in potential results in a negative bias voltage being supplied to the grid 47 of tube VT6 due to the bias voltage source overcoming the positive potential supplied thereto through resistors R7 and R8, with a result that tube VT6 is cut off. The circuit will remain in this second stable state until the value of the potential on the grid 45 of vacuum tube VT5 falls below a second critical or threshold value, which may range from a value almost as high as the first threshold potential to a value considerably lower, and which is determined by the adjustable resistor R10.

The difference between the first and second threshold potential is called "back-lash" and is characteristic of the Schmitt trigger circuit. This characteristic is employed in this system to increase the effective discharge time constant of condenser C5 and thus increase the disparity between the charging and discharging time constants more than would be possible if the trigger circuit were of the type which switched from one state to the other state at nearly the same potential of grid 45. As a result, the detector output integrating network comprising the condensers C4 and C5 and resistors R5 and R6 is simplified and proper operation thereof is better insured.

The second control grid 28 of audio amplifier VT2 is connected in parallel with grid 47 of vacuum tube VT6, so that both grids have the same potential impressed thereon. It will be apparent therefore, that since the grid 47 of tube VT6 normally has a positive potential as explained above, the grid 28 of vacuum tube VT2 will also have a positive potential, and, as previously explained, will permit tube VT2 to conduct. Accordingly, in the normal condition, an incoming signal picked up by antenna RA and supplied to the demodulator-amplifier DA will be demodulated and amplified and a resulting audio frequency energy will be passed by tube VT2 to the output amplifier OA and thence to the loud speaker LS to audibly reproduce the incoming signal.

A voltage divider comprising resistors R11, R12, and R13 between the positive terminal B(+) of the high voltage power supply and the negative terminal C(−) of the grid bias voltage supply is connected with the plate of tube VT6. The second control grid 9 of keyer tube VT1 is connected to the junction 51 of resistors R12 and R13. The parts are proportioned and arranged so that with the trigger circuit in its normal state with vacuum tube VT6 conducting, the negative potential of the bias voltage supply is greater than the positive voltage from the high voltage power supply at the junction 51, and a negative bias voltage is applied to the grid 9 of the keyer tube VT1. Accordingly, when the trigger circuit is in its normal state, the keyer tube VT1 is cut off, so that the transmitter is rendered inactive.

From the foregoing description, it will be seen that the transmitter is normally inactive, and the receiver is active, so that incoming messages may be received.

It will now be assumed that the operator desires to transmit a message, and accordingly speaks into the microphone MIC. The voice frequencies of the audio frequency energy supplied from the microphone MIC are filtered by the voice frequency band pass filter VF, and are then supplied to the modulator-oscillator MO, to thereby modulate the carrier frequency and the modulated carrier frequency is supplied to the grid 5 of the keyer tube VT1. Additionally, the voice frequency energy is supplied to the isolating amplifier VT3, and the amplified voice frequency energy is thereafter rectified by the full wave rectifier RX and supplied to the syllabic frequency filter SF, where the fundamental frequency components of the speech are filtered out, and the speech envelopes or syllabic frequencies are passed to the detector tube VT4, where they are rectified and then supplied through the integrating network to the grid 45 of vacuum tube VT5.

The voltage supplied to the grid 45 of vacuum tube VT5 at this time is sufficient to cause the trigger circuit to switch to its second state. As previously explained the polarity of the bias voltages of grid 9 of vacuum tube VT1 and grid 29 of vacuum tube VT2 change when the trigger circuit operates from its normal state to its second state, so that vacuum tube VT1 is rendered conductive and vacuum tube VT2 is cut off.

As a result, at this time the receiver is rendered inactive, so that incoming signals are not reproduced in the loud speaker LS, and the transmitter is rendered active, so that the modulated carrier frequency supplied from the modulator-oscillator MO through keyer VT1 to the power amplifier PA is transmitted thereafter from the antenna TA.

As previously explained, the coupling network associated with detector tube VT4, and the trigger circuit are arranged to bridge gaps between syllables of speech, so that the apparatus remains in its second state as described above until a pause occurs in the conversation, or in other words until the end of a "talk-spurt."

At the end of a "talk-spurt," syllabic frequency energy is no longer supplied to the detector VT4, and as a result the voltage of the energy supplied to the grid 45 of tube VT5 falls to zero, and the trigger circuit reverts to its normal state.

When the trigger circuit returns to its normal state, the vacuum tube VT1 will be cut off and vacuum tube VT2 will be rendered conductive as previously explained, so that the transmitter is again rendered inactive, and the receiver is rendered active.

It will be apparent therefore that during the time the message is being transmitted from the station, the receiver is rendered inactive only at such times as the operator is speaking into the microphone, and that during pauses in his conversation or speech, the transmitter is rendered inactive and the receiver is rendered active, and any incoming signals will be heard by the operator during the pauses in his speech.

If during the time that the operator is transmitting a message, a second station desires to break-in on his transmission, the operator at the second station depresses the push button PB1 associated with his equipment, so that a call signal is transmitted. At the transmitting station, during the pauses of speech of the transmitting operator, he can hear the break-in or call signal through the loud speaker. The break-in signal is of course received in the usual manner at all stations which are receiving, but as previously explained the break-in system as herein shown and described is advantageous in that the operator at the transmitting station will be notified that another station desires to break in on his transmission.

An advantage of the equipment arranged as shown and embodying my invention is that the switching means is not responsive to noise or random sounds, and additionally is not responsive to any steady tone which is picked up by the microphone MIC. This is of advantage when the equipment is to be used in a location where the ambient noise level is comparatively high, such as in an airplane, or in a railway locomotive. As previously pointed out, the switching means is responsive only to those frequencies associated with human speech, or syllabic frequencies, and a steady tone will not be passed by the syllabic frequency filter, and random bursts of noise will not charge the integrating network associated with detector VT4 to a sufficient value to cause the vacuum tube VT5 to be tripped.

Referring to Fig. 2, there is shown a fragmentary view of the apparatus shown in Fig. 1, in which the call signal oscillator is arranged and constructed so that, when energized, it provides audio frequencies modulated at a syllabic frequency rate, so that the switching portion of the station equipment is actuated thereby.

The apparatus comprises a gas tube VT7, which may be a neon bulb, a timing condenser C7, a charging resistor R14, and an audio frequency oscillator including the vacuum tube VT8, the resistors R17 and R18, condensers C8 and C9, and a transformer OT having a tapped primary winding 55 and a secondary winding 57.

The audio oscillator may be arranged and constructed in any of the arrangements well known in the art and as here shown is a Hartley type of oscillator. It is deemed sufficient to point out that when energy is supplied to the plate 59 and a positive potential is supplied to the grid 61 of tube VT8, the oscillator generates energy in the audio frequency range, say, for example, 3000 cycles per second, and this energy is supplied to the secondary winding 57 of transformer OT.

The gas tube VT7 is proportioned and arranged to function as a relaxation oscillator having a frequency within the syllabic frequency range, say, for example, 10 cycles per second.

In operation, if the operator desires to transmit a call signal, he depresses the push button PB1. Energy is thereby supplied to the relaxation oscillator and the audio oscillator. The condenser C7 is charged through the charging resistor R14 until the voltage across the condenser exceeds the ionizing voltage of tube VT7, and when the voltage exceeds the ionizing voltage of tube VT7, the tube conducts until the potential is reduced below its deionizing potential at which time it becomes extinguished. The cycle is repeated as long as power is supplied to the circuit, and as previously stated, the parts are arranged and proportioned so that the tube fires about ten times per second. The grid 61 of tube VT8 is connected to condenser C7, so that the voltage impressed on grid 61 varies in accordance with the condenser voltage. Resistor R17 serves the dual function of a grid bias resistor for grid 61 and as a bleeder for condenser C7. It will be seen therefore that at this time, the grid potential of grid 61 of tube VT8 is varied about 10 times per second by the operation of the relaxation oscillator, so that the audio oscillator is alternately rendered operative and inoperative about ten times per second. Accordingly, the output energy in the secondary winding 57 of the oscillator transformer OT will comprise a modulated audio frequency of 3000 cycles the envelope of which will have a frequency of 10 cycles per second. Since this energy has the same frequency characteristics as speech, namely, in the voice frequency range and modulated by a frequency in the syllabic frequency range, it will be apparent that the energy supplied from secondary winding 57 will cause the switching means to render the transmitter active and the receiver inactive. As a result, a call signal is transmitted which when received and demodulated provides a distinctive calling signal.

Although I have herein shown and described only two forms of communication systems embodying my invention, it is to be understood that various changes and modifications may be made therein within the scope of the appended claims without departing from the spirit and scope of my invention.

Having thus described my invention, what I claim is:

1. In a communication system, in combination, a transmitter operative at a given carrier frequency and adapted to be modulated by voice frequencies, a receiver operating at said given frequency, switching means effective when rendered operative for selectively activating said transmitter and deactivating said receiver, said switching means comprising means responsive to frequency variations in the syllabic frequency range of the voice frequencies supplied for the modulation of said transmitter and having a timing characteristic such that the switching means becomes operative upon the supply thereto of audio frequency energy having a component in the syllabic frequency range only and remains operative during relatively short interruptions in the supply of said energy, said timing characteristic being such that said switching means does not operate upon the supply thereto of random bursts of energy in said syllabic frequency range, and call signal means comprising means for at times supplying said transmitter and said switching means with energy having a frequency within the voice frequency range and modulated at a frequency within the syllabic frequency range.

2. In a communication system each station of which includes a transmitter and a receiver operating on the same carrier frequency, the combination comprising; switching means including a rectifier, a high frequency cut off filter, a detector and a trigger circuit connected in the order named; said switching means effective to create bias voltages in the output of said trigger circuit in response to the syllabic frequency of a voice frequency current applied to said rectifier, circuit means to connect the input of said rectifier to the input of said transmitter to receive a portion of a voice frequency current supplied to said transmitter, other circuit means to connect said trigger circuit to said transmitter and to said receiver to apply said bias voltages thereto, and said other circuit means disposed for said bias voltages to render the transmitter active and the receiver inactive or vice versa according as the voice frequency current is or is not applied to said rectifier.

3. In a communication system each station of which includes a transmitter and a receiver operating on the same carrier frequency, the combination comprising; switching means including a rectifier, a high frequency cut off filter, a detector and a trigger circuit connected in the order named; said switching means effective to create bias voltages in the output of said trigger circuit in response to the syllabic frequency of a voice frequency current applied to said rectifier, circuit means to connect the input of said rectifier to the input of said transmitter to receive a portion of a voice frequency current supplied to said transmitter, other circuit means to connect said trigger circuit to said transmitter and to said receiver to apply said bias voltages thereto, said other circuit means disposed for said bias voltages to render the transmitter active and the receiver inactive or vice versa according as the voice frequency current is or is not applied to said rectifier; call signal generating means comprising an oscillator capable of generating alternating current having a frequency within the voice frequency range; modulating means for modulating said oscillator at a frequency lying within the syllabic frequency range, coupling means for coupling the output of said oscillator to the input of said transmitter and to said switching means; and manually controllable means for at times energizing said oscillator and said modulating means.

ELBERT W. MARLOWE.

REFERENCES CITED

The following references are of record in the file of this patent:

UNITED STATES PATENTS

| Number | Name | Date |
|---|---|---|
| 1,298,613 | White | Mar. 25, 1919 |
| 1,916,016 | Rives | June 27, 1933 |
| 1,970,423 | Frink | Aug. 14, 1934 |
| 1,975,270 | Hansell | Oct. 2, 1934 |
| 2,101,668 | Bishop et al. | Dec. 7, 1937 |
| 2,144,936 | Rochow | Jan. 24, 1939 |
| 2,213,398 | Kircher | Sept. 3, 1940 |